Aug. 18, 1953 — C. T. WALTER — 2,649,294
HOUSEHOLD SCALE
Filed July 11, 1947 — 2 Sheets-Sheet 1
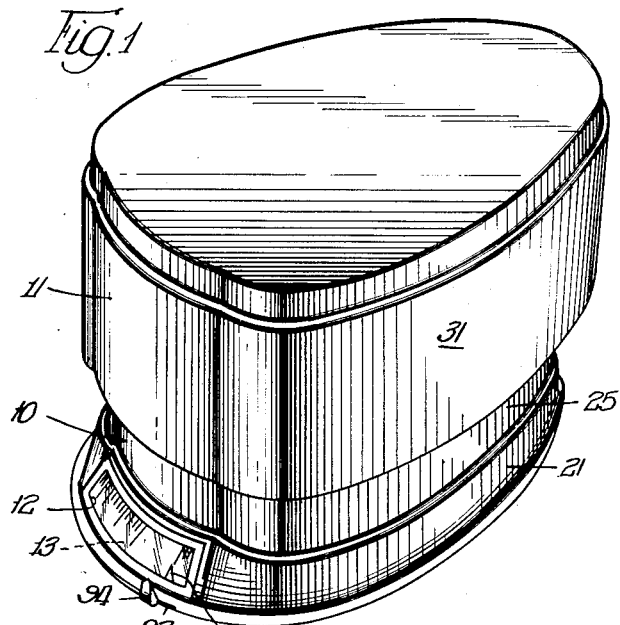
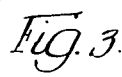
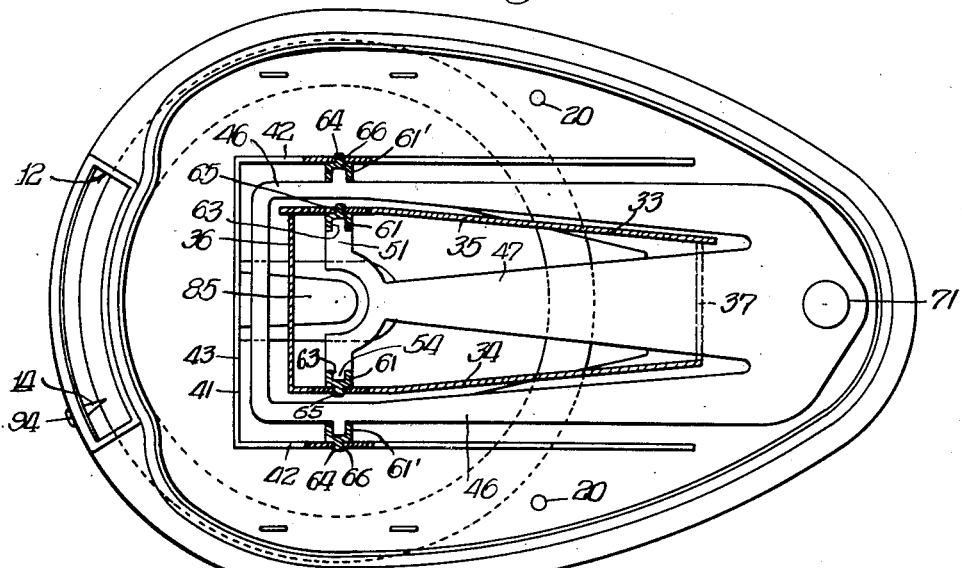
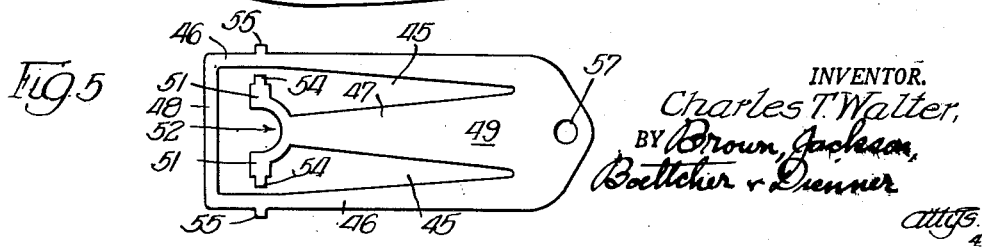
INVENTOR.
Charles T. Walter,
BY Brown, Jackson,
Boettcher & Dienner
ATTYS.

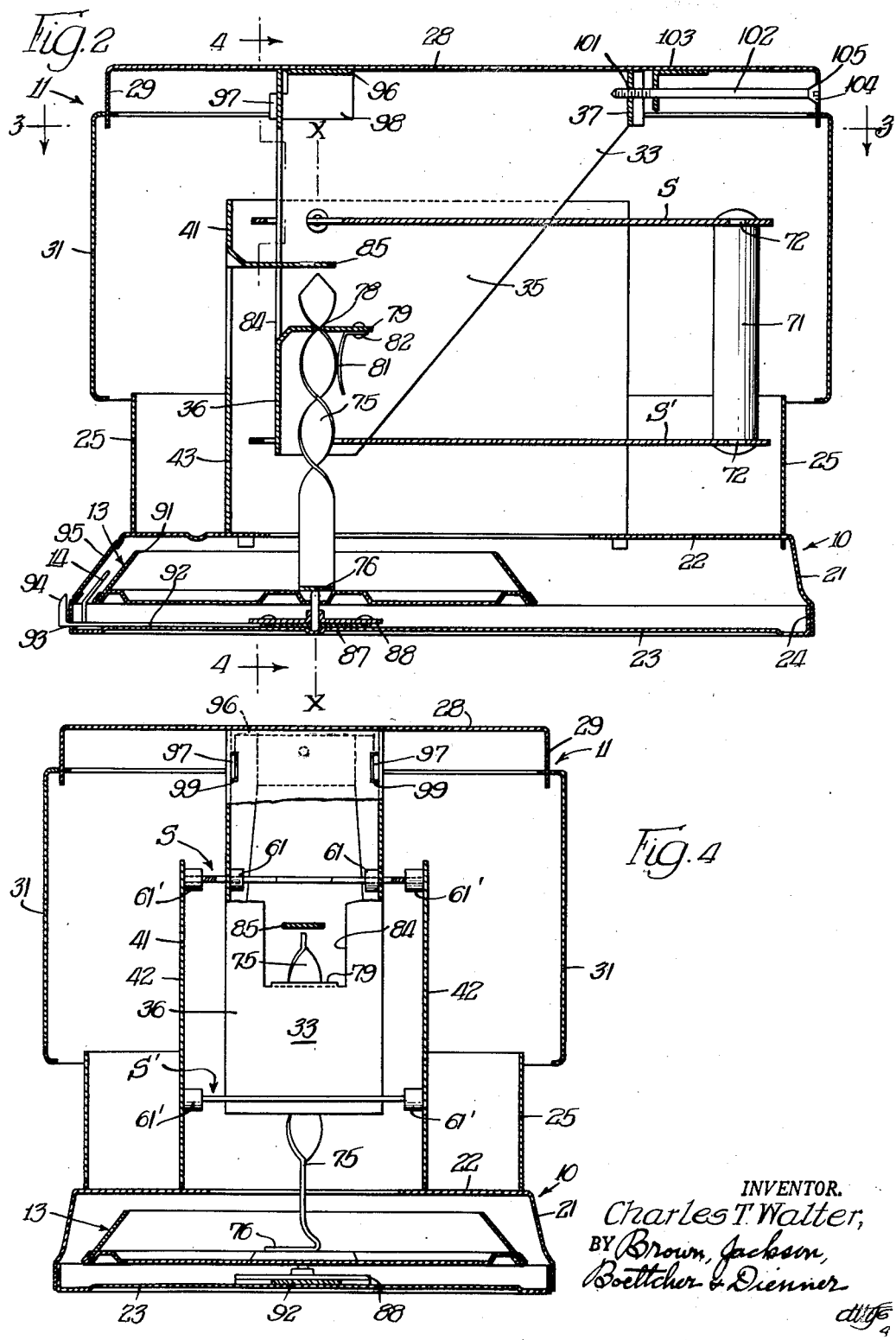

Patented Aug. 18, 1953

2,649,294

UNITED STATES PATENT OFFICE 2,649,294

HOUSEHOLD SCALE

Charles T. Walter, Harvey, Ill.

Application July 11, 1947, Serial No. 760,286

17 Claims. (Cl. 265—63)

The present invention relates to an improved weighing scale, particularly adapted for general utility use in the kitchen or around the household. Weighing scales of this general classification usually have a maximum scale indication ranging anywhere from fifteen pounds to thirty pounds, or so. However, I wish it to be understood that my invention is not limited to any particular scale range.

The present invention is an improvement upon or a further development of the construction of weighing scale disclosed in my prior copending application, Serial No. 693,327, filed August 27, 1946. The scale disclosed in this copending application is primarily a postal scale, or a small folding type of scale adapted for weighing light objects. The principal feature of my earlier construction is a unique form of weighing spring of double cantilever leaf construction. This improved double cantilever leaf spring is punched out of a single piece of sheet metal, and results in a weighing spring of large deflection range, increased accuracy, and very low cost of construction.

One of the principal objects of the invention disclosed in the present application is to provide a larger capacity weighing scale characterized by the use of a plurality of these improved double cantilever leaf springs.

Another object of the invention is to provide a simplified, accurate weighing scale in which all complicated systems of links and levers for supporting the weighing pan and for transmitting motion to the indicating mechanism are eliminated.

Another object of the invention is to support the weighing pan on two or more leaf springs arranged in a vertically spaced series, or vertical stack, so that the leaf springs function as a vertically acting parallel link system for controlling the vertical motion of the weighing pan.

Another object is to provide an improved arrangement of upper and lower leaf springs in which the stationary ends of the leaf springs have pivotal connection with the supporting base of the scale on a plurality of vertically spaced horizontal pivot axes, and in which the flexing ends of the leaf springs have pivotal connection with the movable pan on a plurality of vertically spaced, horizontal pivot axes.

Another object is to provide such an arrangement in which the stationary pivot axis and the movable pivot axis of the upper spring, and the stationary pivot axis and the movable pivot axis of the lower spring, are all disposed in substantially the same vertical plane so that the vertical motion of the weighing pan is substantially a straight line motion, and so that there is a minimum amount of friction affecting the vertical motion of said pan.

Another object of the invention is to provide improved indicator mechanism characterized by a large diameter horizontally disposed indicating drum having relatively large scale divisions around the drum to facilitate reading the scale.

Another object of the invention is to provide such a construction in which the indicating drum or dial is mounted to rotate horizontally within the base portion of the scale, and in which rotative movement is transmitted to the indicating drum by the vertical motion of the scale pan through the instrumentality of a simplified form of helical ribbon actuating mechanism.

Other objects, features and advantages of the invention will be apparent from the following detailed description of one preferred embodiment thereof.

In the accompanying drawings illustrating such embodiment:

Figure 1 is a perspective view looking diagonally downwardly at the scale;

Figure 2 is a vertical, sectional view taken through the longitudinal vertical plane of the scale;

Figure 3 is a horizontal, sectional view corresponding to a section taken approximately on the plane of the line 3—3 of Figure 2;

Figure 4 is a transverse, vertical, sectional view taken approximately on the plane of the line 4—4 of Figure 2; and Figure 5 is a detail plan view of one of the leaf springs before its assembly in the scale.

As best shown in Figure 1, the scale comprises a base portion 10 and a weighing pan or platform 11 which is superposed directly over the base portion. As shown in Figure 3, this base portion and weighing platform preferably have an artistically curved planform which is of circular or arcuate outline at the front end and which tapers back in an elliptical formation at the rear end of the scale. This artistic configuration has been made the subject matter of design patent application, Serial No. D. 140,166 filed July 9, 1947. Formed in the circular front end of the base portion 10 is a sloping sight window 12 in which the horizontally disposed indicating dial 13 appears. The scale markings on this dial are read with reference to an adjustable index pointer 14. As will be later described, this zero marking pointer 14 is adjustable across the width of the sight window 12 for the two-fold purpose of always assuring an accurate zero reading, and also of enabling the housewife to set this pointer at a tare setting corresponding to the weight of a pan, box, or other receptacle which she may have placed upon the scale platform for holding articles that she desires to weight.

Referring now to the internal construction of the scale, it will be seen that the base 10 is preferably a sheet metal stamping having a sloping or curved side wall 21 and an inwardly extending upper portion 22. The bottom of this sheet metal stamping is closed off by a bottom plate 23 which has an upwardly extending marginal flange 24 fitting within the downwardly extending wall 21 of the base stamping, being held by screws 20 (Figure 3) passing from plate 23 through wall 22. Extending upwardly from this lower base stamping is a stationary skirt portion 25 which has substantially the same circular and elliptical outline above described. This skirt portion 25 has its lower edge suitably staked or spot welded to the base wall 22, and has its upper end open for receiving the leaf spring assembly, etc.

The weighing platform or pan 11 comprises an upper sheet metal stamping 28 having a solid top surface and a downwardly extending marginal flange 29. Suitably secured to this downwardly extending flange is a depending skirt portion 31 which moves directly with the weighing platform and which extends down to surround the top edge of the lower stationary skirt 25. Extending down from the under side of the weighing platform 11 is a platform support 33 in the form of a box-like sheet metal frame. As shown in plan in Figure 3, this frame comprises a right hand stamping 34 and a left hand stamping 35 extending down in spaced relation from the under side of the weighing platform. The stamping 34 has a transversely extending front wall portion 36 which is welded, or otherwise joined to the left hand stamping 35. As shown in Figure 2, the rear edges of both stampings slope diagonally upwardly, and the upper portion of the stamping 34 is formed with a transversely extending upper portion 37 (shown in dotted lines in Figure 3) which is welded or secured to the other stamping 35. The spaced side walls 34, 35 of this box-like supporting frame 33 carry the vertically spaced pairs of horizontally disposed pivots which establish pivotal connection with the movable ends of the double cantilever leaf springs, as I shall presently describe.

Extending upwardly from the horizontal supporting wall 22 of the base 10 is a somewhat similar box-like supporting frame 41 for supporting the stationary ends of the double cantilever leaf springs. As viewed in plan in Figure 3, this stationary supporting frame 41 is preferably a single sheet metal stamping bent into the U-shaped outline shown, so as to provide the laterally spaced side walls 42, 42, joined by the transversely extending front wall 43. The laterally spaced side walls 42, 42 carry the vertically spaced pairs of stationary pivot bearings establishing the stationary pivotal support of the fixed ends of the leaf springs.

Referring now to the construction and mounting of these leaf springs, I have shown two of these leaf springs in vertically spaced relation, the upper spring being designated S and the lower spring being designated S', both springs being identical. A stack of more than two springs can be employed if desired, particularly for carrying greater weights. Referring particularly to Figure 5 which illustrates one of these leaf springs before assembly in the scale, the spring is preferably in the form of a stamping which is adapted to be punched out of flat sheet metal stock in a single punching operation. The spring is preferably composed of any good spring steel, although different alloys may be employed, such as an aluminum alloy typically represented by 24 ST, particularly in small scales that measure small weights. The stamping has slotted or punched out areas 45 which define outer side legs 46 and an inner central leg 47. The ends of the outer side legs 46 are integrally joined together by a cross bar portion 48. The right hand ends of the outer legs 46, 46 and of the inner leg 47 are integrally joined together at 49, while the left hand end of the inner leg 47 is free to flex into and out of the plane of the outer legs 46. Thus, the outer side legs 46, 46 function together to form an outer leaf spring section of this double cantilever leaf spring, and the inner leg 47 functions as an inner section thereof, these two sections being adapted to flex downwardly in series as weight is applied to the scale platform, so that the total flexure of the entire leaf spring is the cumulative flexures of the two sections. The sectional width of the single inner leg 47 at different points along its length preferably equals the combined width of the two outer legs, 46, 46 at the corresponding points along their lengths, so that both leaf spring sections flex downwardly to substantially the same degree in this cumulative flexure of the sections.. This action is also disclosed in my above-mentioned copending application, Serial No. 693,327. The inner end of the central leg 47 is formed with a T-shaped head or yoke portion 51 having a semicircular recess or opening 52 formed between the laterally projecting arms of the yoke. Pivot lugs 54 project outwardly from the ends of the yoke arms 51 in transversely aligned relation. Pivot lugs 55 also project outwardly from the outer side edges of the outer legs 46, these latter pivot lugs 55 being in transverse axial alignment with the pivot lugs 54 on the inner leg. At the opposite end of the leaf spring, a hole 57 is punched out in the stamping for receiving the connecting post which joins the free ends of the upper and lower leaf springs.

Referring now to the manner in which these upper and lower leaf springs S and S' are mounted in the scale assembly, the inner pivot lugs 54 of each leaf spring have pivotal connection with the platform supporting frame 33 extending down from the weighing platform, and the outer pivot lugs 55 of each leaf spring have pivotal connection with the spring supporting frame 41 extending upwardly from the supporting base 10. Such pivotal connection might be established by merely having the pivot lugs 54 and 55 project directly into pivot apertures formed in the frame structures 33 and 41, respectively. However, in order to reduce pivotal friction to a minimum, I prefer to interpose bearing thimbles or bearing bushings between these pivot lugs and the pivot apertures in the side walls of the frame structures. For example, I mount pivot bushings 61 over the inner pivot lugs 54, and mount pivot bushings 61' over the outer pivot lugs 55, these inner and outer pivot bushings preferably being identical. Each bushing consists of a bearing socket 63 adapted to fit rotatably over the respective pivot lug 54 or 55, and a pivot stud 64 projecting outwardly from the end of the bearing socket. The pivot studs 64 associated with the inner pivot lugs 54 have freely rotating bearing support in pivot apertures 65 formed in the side walls of the pan supporting frame 33, and the pivot studs 64 associated with the outer pivot lugs 55 have freely rotating bearing support in pivot apertures 66 formed in the side walls of the spring supporting frame 41. The transversely aligned pivot holes 65 in the pan supporting frame 33 define a movable pivot axis which is free to move downwardly as weight is placed on the weighing platform and as the leaf spring flexes downwardly under the force of this weight. On the other hand, the pivot holes 66 in the opposite side walls of the stationary spring supporting frame 41 define a stationary pivot axis which supports the leaf spring upon the supporting base. As will be seen from Figure 3, this movable pivot axis connected with the inner leg 47 of the leaf spring, and this stationary pivot axis connected with the outer legs 46 of the leaf spring, are preferably disposed in substantially the same transverse vertical plane, such vertical plane being diagrammatically indicated by the dash and dot line X—X. In addition to being disposed substantially in the same transverse vertical plane, this movable pivot axis and stationary pivot axis are also preferably disposed in substantially the same horizontal plane when no load is imposed on the weighing platform. At such time, the inner leg 47 of each leaf spring lies in substantially the same horizontal plane with the outer legs 46, 46, as shown in Figure 2.

What has been said above with respect to the mounting and arrangement of the pivot studs and pivot axes of one leaf spring applies identically to the other leaf spring, and to any number thereof if more than two leaf springs are arranged in the vertical stack of springs. The movable pivot axes 65 and the stationary pivot axes 66 of all springs in the series or stack are all preferably disposed substantially in the transverse vertical plane X—X. The unconnected or free ends of these leaf springs are then connected together at a fixed spacing by a spacing post 71. This spacing post may have reduced ends 72 passing through the holes 57 in the leaf springs and headed over on the top and bottom sides of the upper and lower leaf springs, or the spacing post may consist of a through bolt having a spacing sleeve mounted thereon. The action of this spacing post is to bind the free ends of the two leaf springs together, so that these free ends always remain in parallel relation in the different flexed positions of the two leaf springs. The same relation is maintained if more than two leaf springs are employed. It will be seen from the foregoing that the leaf springs S and S' function somewhat analogously to a vertically acting parallel link system for controlling the vertical motion of the weighing platform. Thus, the vertical motion of the weighing platform is substantially a straight line motion, and because the inner leg and the two outer legs of each spring both flex through substantially the same degree of vertical flexure in the downward motion of the weighing platform, it follows that there is substantially no fore and aft displacement of the weighing platform in such upward and downward straight line motion.

Referring now to the indicating dial 13 and its actuating mechanism, the dial is rotated through the action of a spiral or twisted ribbon 75 which is formed from a sheet metal strip. The lower end of this ribbon or strip is secured at 76 to the indicating dial, with the ribbon extending upwardly substantially axially of the dial. The twisted portion of the ribbon passes through a narrow rectangular slot 78 extending transversely in a sheet metal lug 79 which is punched out from the transverse front wall 36 of the platform supporting frame 33, and which is bent to extend at substantially right angles to this front wall. A thin curved leaf spring 81 is riveted at 82 to the supporting lug 79 and is arranged to exert a light lateral pressure against the twisted ribbon for holding the latter pressed against the forward edge of the slot 78, thereby minimizing or eliminating backlash or play between the twisted ribbon and its actuating slot. This arrangement insures that the dial shall be accurately responsive to relatively small movements of the weighing platform. The punching and downward bending of the lug or tongue 79 leaves a slot 84 in the front wall 36 of the platform supporting frame 33. Extending rearwardly through this slot 84 is a limiting stop lug 85 which lies directly above the upper end of the twisted ribbon 75, but spaced therefrom, whereby to stop any upward throw of the twisted ribbon in any quick upward motion of the weighing platform. The stop lug or finger 85 consists of a sheet metal portion punched out of the front wall 43 of the stationary spring supporting frame 41.

The indicating dial and the spiral ribbon have bearing support upon a bearing stud 87 which is anchored in the base pan 23 and in a fixed bearing bracket 88 spaced from the base pan 23. This bearing stud extends up through a bearing opening in the bottom wall of the indicating dial and has a spherical upper end which has thrust bearing engagement against the horizontally bent lower end 76 of the actuating ribbon. The indicating dial is provided with a sloping dial portion 91 on which the scale markings are inscribed, the angle of this sloping dial portion corresponding substantially to the sloping angle of the sight window 12, whereby the scale markings can be easily read when looking diagonally downwardly toward the front of the device. The adjustable index pointer 14 is carried by a horizontally extending swinging arm 92 which extends inwardly into the space between the bottom base wall 23 and spaced bearing bracket 88, this end of the arm 92 being apertured for rotative movement around the axis of the bearing stud 87, and having spring fingers punched laterally therefrom to frictionally hold the pointer arm in any set position. The outer end of the arm 92 projects out through a horizontal slot 93 formed in the vertical side wall of the base section 10, and the outer extremity of this arm is formed with an upwardly bent finger tip 94 which enables the index pointer arm to be shifted to different positions across the width of the sight window. As previously described, this adjustability of the index pointer 14 is for the two-fold purpose of always showing an accurate zero reading, and also of enabling the housewife to set this index pointer at a tare setting corresponding to the weight of a pan, box or any other receptacle which the housewife may place upon the scale platform for holding articles or material that she desires to weigh. The sloping sight window 12 is closed by a transparent pane 95 composed of glass or any suitable plastic material.

It will be noted that the vertical axis of the spiral ribbon 75 and of the indicating dial 13 is disposed in the same vertical plane X—X with the stationary pivot axes and the movable pivot axes of the leaf springs. As shown in Figure 3, the spiral ribbon 75 passes through the semicircular recess 52 formed in the inner end of the central leg 47 of each leaf spring. This vertically aligned relation between the spiral ribbon and the stationary and movable pivot axes insures that there will be no binding of the spiral ribbon or of the indicating dial in the vertical motion of the weighing platform.

In order to simplify assembly of the parts, and also to facilitate inspection and repair, the weighing platform 11 is made readily separable from the platform supporting frame 33. As best shown in Figures 2 and 4, a U-shaped strap 96 is riveted or welded to the under side of the top plate 28 and has hook-shaped lugs 97 projecting forwardly from the downturned side arms 98 of the strap. These downturned side arms are adapted to have a snug sliding fit between the side walls 34, 35 of the frame 33. The hook-shaped lugs 97 are adapted to slide forwardly into narrow vertical locking slots 99 formed in the transverse front wall 36 of frame 33. The transversely extending rear wall 37 of frame 33 has a threaded hole 101 therein for the reception of a locking screw 102. This screw passes freely through an apertured guide bracket 103 which projects down from the under side of the top plate 28, and the outer end of the screw is provided with a beveled head 104 seating in an aperture 105 in the downwardly extending wall 29. To remove the weighing platform 11 from the frame 33, the screw 102 is merely backed out of the threaded hole 101, thereby enabling the platform to be shifted rearwardly sufficiently to release the hook lugs 97 from the slots 99, whereupon the platform can be lifted clear of the frame 33. In reassembling the platform upon said frame, the hook lugs 97 are hooked into the slots 99 and the screw 102 is then introduced into the threaded aperture 101 and is screwed forwardly for pulling the weighing platform in a forward direction relatively to the frame 33, thereby locking the platform to the frame at the hook lugs 97 and also at the screw connection 102.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a weighing scale, the combination of a stationary support, a movable weighing support, a plurality of leaf springs in superposed relation for operatively connecting said movable weighing support with said stationary support, each of said leaf springs being of multiple cantilever construction comprising a plurality of spring sections flexing in series, pivot means pivotally connecting one of said sections with said stationary support, and pivot means pivotally connecting the other of said sections with said movable weighing support.

2. In a weighing scale, the combination of a supporting member, a movable weighing support, a plurality of leaf springs in superposed relation pivotally connected with said supporting member and with said movable weighing support, each of said leaf springs being of double cantilever construction comprising two side-by-side sections flexing in series, and pivot means between said supporting member and one section of said spring permitting free vertical pivoting movement of each spring relative to said supporting member.

3. In a weighing scale, the combination of a stationary support, a movable weighing support, a plurality of leaf springs operatively connected between said stationary support and said weighing support to function analogously to a vertically acting parallel link system for controlling the vertical motion of said movable weighing support, each of said leaf springs being of double cantilever construction comprising two side-by-side sections flexing in series, pivot means pivotally connecting one of the sections of each leaf spring with said stationary support, and pivot means pivotally connecting the other of said sections of each leaf spring with said movable weighing support.

4. In a weighing scale, the combination of a stationary support, a movable weighing support, and mechanism for movably mounting said weighing support upon said stationary support consisting solely of a plurality of superposed leaf springs pivotally connected with said stationary support and with said movable weighing support in such manner as to function analogously to a vertically acting parallel link system for controlling the vertical motion of the movable weighing support, each of said leaf springs comprising an outer section having spaced side legs and a separately flexing inner section between said side legs, one of said sections being pivotally connected with said stationary support, and the other of said sections being pivotally connected with said movable weighing support.

5. In a weighing scale, the combination of a stationary support, a movable weighing support, a plurality of double cantilever leaf springs of general E-shape operatively connected between said stationary support and said movable weighing support, each of said double cantilever leaf springs comprising an outer section having spaced side legs and a separately flexing inner section between said side legs, means pivotally connecting one of said sections of each spring with said stationary support, and means operatively connecting the other section of each spring with said movable weighing support.

6. In a weighing scale, the combination of a stationary support, a movable weighing support, and a plurality of double cantilever leaf springs each comprising an outer section having spaced side legs and a separately flexing inner section between said side legs, said leaf springs being pivotally connected in superposed relationship with one section of each spring connected with said stationary support and the other section of each spring connected with said movable weighing support.

7. In a weighing scale, the combination of a stationary support, a movable weighing support, upper and lower leaf springs, stationary pivot means pivotally connecting each of said leaf springs with said stationary support, at laterally spaced points of a horizontal stationary pivot axis, and movable pivot means pivotally connecting each of said leaf springs with said movable weighing support at laterally spaced points of a horizontal movable pivot axis, said stationary pivot means and said movable pivot means being disposed in substantially the same vertical plane extending substantially transversely of said leaf springs.

8. In a weighing scale, the combination of a stationary support, a movable weighing support, upper and lower leaf springs, stationary pivot means pivotally connecting one end of each of said leaf springs with said stationary support at two laterally spaced points of a horizontal stationary pivot axis, and movable pivot means pivotally connecting one end of each of said leaf springs with said movable weighing support at two laterally spaced points of a horizontal movable pivot axis, said stationary and movable pivot axes being disposed in substantially a common vertical plane which extends transversely of said leaf springs, and causing said movable weighing support to move vertically with a substantially straight line motion.

9. In a weighing scale, the combination of a stationary support, a movable weighing support, upper and lower leaf springs each comprising two portions joined together at a junction end of each leaf spring and having their other extremities free for relative flexing movement, means pivotally connecting one portion of each of said leaf springs with said stationary support, means connecting another portion of each of said leaf springs with said movable weighing support, and spacing means for maintaining a predetermined spacing between the junction ends of said leaf springs.

10. In a weighing scale, the combination of a stationary support, a movable weighing support, upper and lower leaf springs each comprising two side-by-side sections joined together at a junction end of each leaf spring and having their other extremities in close proximity to each other and capable of relative flexing movement, stationary pivot means pivotally connecting one section of each of said leaf springs with said stationary support, movable pivot means pivotally connecting the other section of each of said leaf springs with said movable weighing support, and vertical spacing means for maintaining a predetermined vertical spacing between the junction ends of said upper and lower leaf springs.

11. In a weighing scale, the combination of a stationary support, a movable weighing support, a plurality of multiple cantilever leaf springs, each of said leaf springs comprising a plurality of spring sections integrally joined together at one end and having their other ends disposed in proximity to each other and capable of relative flexing in series, means pivotally connecting one section each leaf spring with said stationary support, and means pivotally connecting one section of each leaf spring with said movable weighing support.

12. In a weighing scale, the combination of a stationary support, a movable weighing support, a plurality of double cantilever leaf springs, each of said leaf springs comprising two side-by-side sections integrally joined together at a junction end of each leaf spring and having their other extremities free for relative flexing in series, means pivotally connecting one section of each leaf spring with said stationary support, means pivotally connecting the other section of each leaf spring with said movable weighing support, and spacing means for maintaining a predetermined spacing between said junction ends of said leaf springs.

13. In a weighing scale, the combination of a stationary support, a movable weighing support, upper and lower leaf springs, stationary pivot means pivotally connecting each of said leaf springs with said stationary support for free vertical pivotal movement of said leaf springs relatively to said stationary support, movable pivot means pivotally connecting each of said leaf springs with said movable weighing support, said stationary and movable pivot means being disposed in substantially a common vertical plane extending substantially transversely of said leaf springs, a rotary indicating dial, and a rotary actuating device for actuating said dial, said actuating device being disposed in substantially said same vertical plane with said stationary and movable pivot means.

14. In a weighing scale, the combination of a base, a movable weighing platform, a plurality of leaf springs of E-shape outline operatively connected between said weighing platform and said base, each of said leaf springs being of double cantilever construction comprising two side-by-side sections flexing in series, means pivotally connecting one section of each spring with said base, means pivotally connecting the other section of each spring with said movable weighing platform, a rotary indicating dial disposed substantially horizontally in said base, and mechanism for transmitting motion from said weighing platform to said dial comprising a relatively movable guide slot and twisted ribbon responding to vertical motion of said weighing platform.

15. In a weighing scale of the class described, the combination of a supporting base having an upwardly extending stationary support, a vertically movable load receiving platform above said base having a downwardly extending movable support, and mechanism for movably mounting said movable support upon said stationary support, consisting solely of a plurality of superposed leaf springs connected with said stationary support and with said movable support, and with said leaf springs spaced apart vertically a substantial distance so as to function analogously to a vertically acting parallel link system for obtaining a substantially straight-line vertical motion of said load receiving platform, each of said leaf springs being of E-shaped double cantilever form comprising spaced outer legs and an inner leg therebetween, and with all three legs joined together at one end of the leaf spring, the opposite free end of said inner leg extending out to the same length as the free ends of said outer legs, outer connecting pivots connecting the free ends of said spaced outer legs with one of said supports, inner connecting pivots connecting the free end of said inner leg with the other of said supports, said outer connecting pivots and said inner connecting pivots being disposed substantially in the same vertical transverse plane extending substantially at right angles to the lengths of said outer inner legs, the other ends of said leaf springs being capable of vertical free floating movement, and a spacing post mounted between said vertically spaced leaf springs at said free floating ends thereof remote from said outer connecting pivots and said inner connecting pivots.

16. In a weighing scale of the class described, the combination of a supporting base having an upwardly extending stationary support, a vertically movable load receiving platform above said base having a downwardly extending movable support, and mechanism for movably mounting said movable support upon said stationary support, consisting solely of a plurality of superposed leaf springs connected with said stationary support and with said movable support and with said leaf springs spaced apart vertically a substantial distance so as to function analogously to a vertically acting parallel link system for obtaining a substantially straight-line vertical motion of said load receiving platform, each of said leaf springs being of double cantilever form comprising two sections of substantially equal length joined together at one end, first connecting pivots for connecting the other end of one of said sections with said stationary support, second connecting pivots for connecting the same end of the other of said sections with said movable support, said first and second connecting pivots being disposed substantially in the same vertical transverse plane extending substantially at right angles to the lengths of said leaf spring sections, and a spacing post mounted between said superposed leaf springs at those ends thereof which are remote from said first and second connecting pivots.

17. In a device of the character described, the combination of a supporting base having a stationary support, a vertically movable force receiving member, associated with the base and having a vertically extending movable support, and mechanism for movably mounting said movable support upon said stationary support, consisting solely of a plurality of superposed leaf springs connected with said stationary support and with said movable support, and with said leaf springs spaced apart vertically a substantial distance so as to function analogously to a vertically acting parallel link system for obtaining substantially straight-line vertical motion of said force receiving member, each of said leaf springs being of E-shaped double cantilever form comprising spaced outer legs and an inner leg therebetween, and with all three legs joined together at one end of the leaf spring, the opposite free end of said inner leg extending out to the same length as the free ends of said outer legs, outer connecting means connecting the free ends of said spaced outer legs with one of said supports, inner connecting means connecting the free end of said inner leg with the other of said supports, said outer connecting means and said inner connecting means being disposed substantially in the same vertical transverse plane extending substantially at right angles to the lengths of said outer and inner legs, the other ends of said leaf spring being capable of vertical free floating movement and a spacing post mounted between said vertically spaced leaf springs at said free floating ends thereof remote from said outer connecting means and said inner connecting means.

CHARLES T. WALTER.

References Cited in the file of this patent

UNITED STATES PATENTS

| Number | Name | Date |
|---|---|---|
| 66,524 | Shaler | July 9, 1867 |
| 371,920 | Both | Oct. 25, 1887 |
| 978,204 | Prouty | Dec. 13, 1910 |
| 1,159,416 | Powers | Nov. 9, 1915 |
| 1,397,518 | Hem | Nov. 22, 1921 |
| 1,540,298 | White | June 2, 1925 |
| 1,772,277 | Carlson | Aug. 5, 1930 |

FOREIGN PATENTS

| Number | Country | Date |
|---|---|---|
| 251,621 | Germany | Oct. 4, 1912 |
| 598,580 | Germany | June 13, 1934 |